United States Patent Office 3,329,456
Patented July 4, 1967

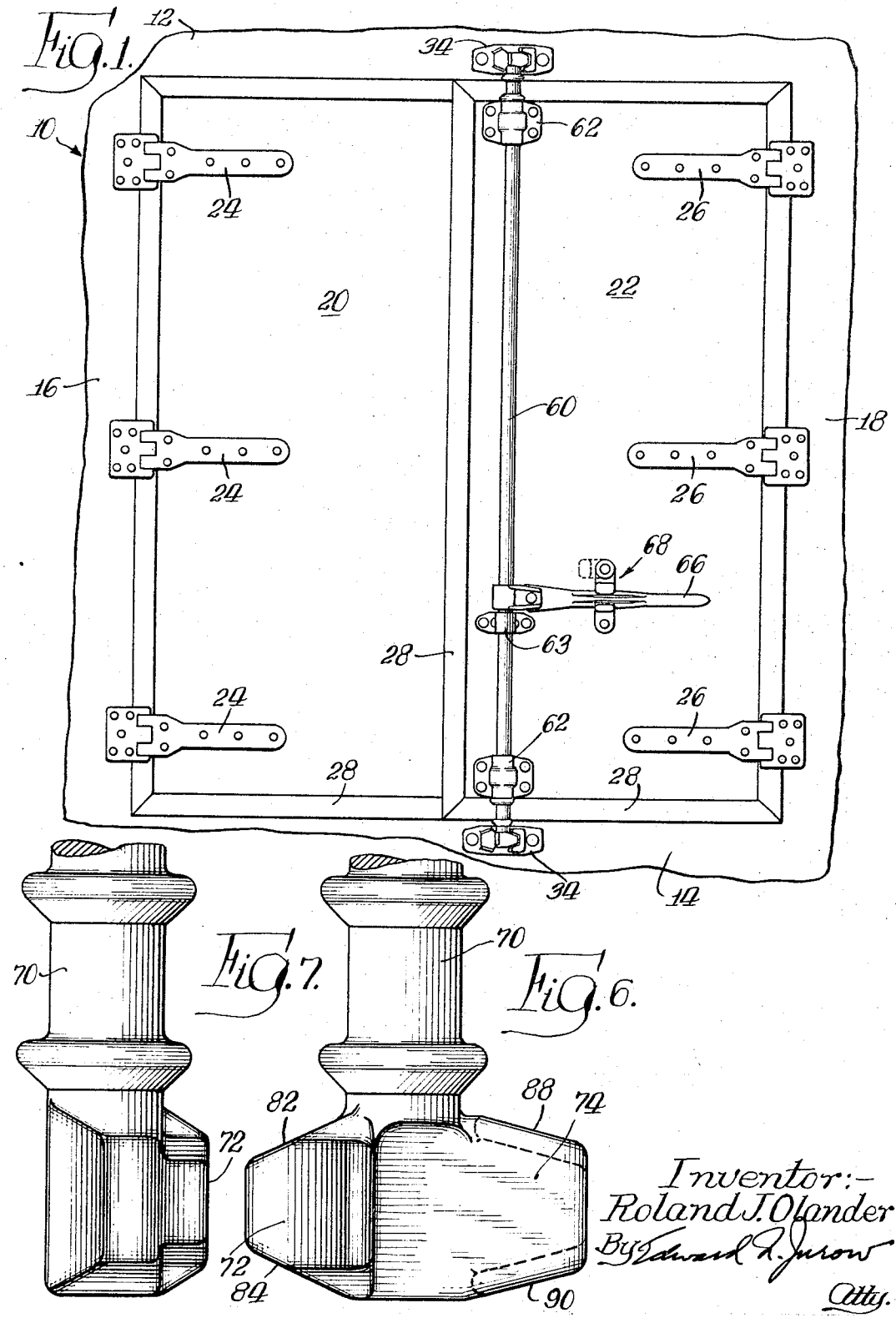

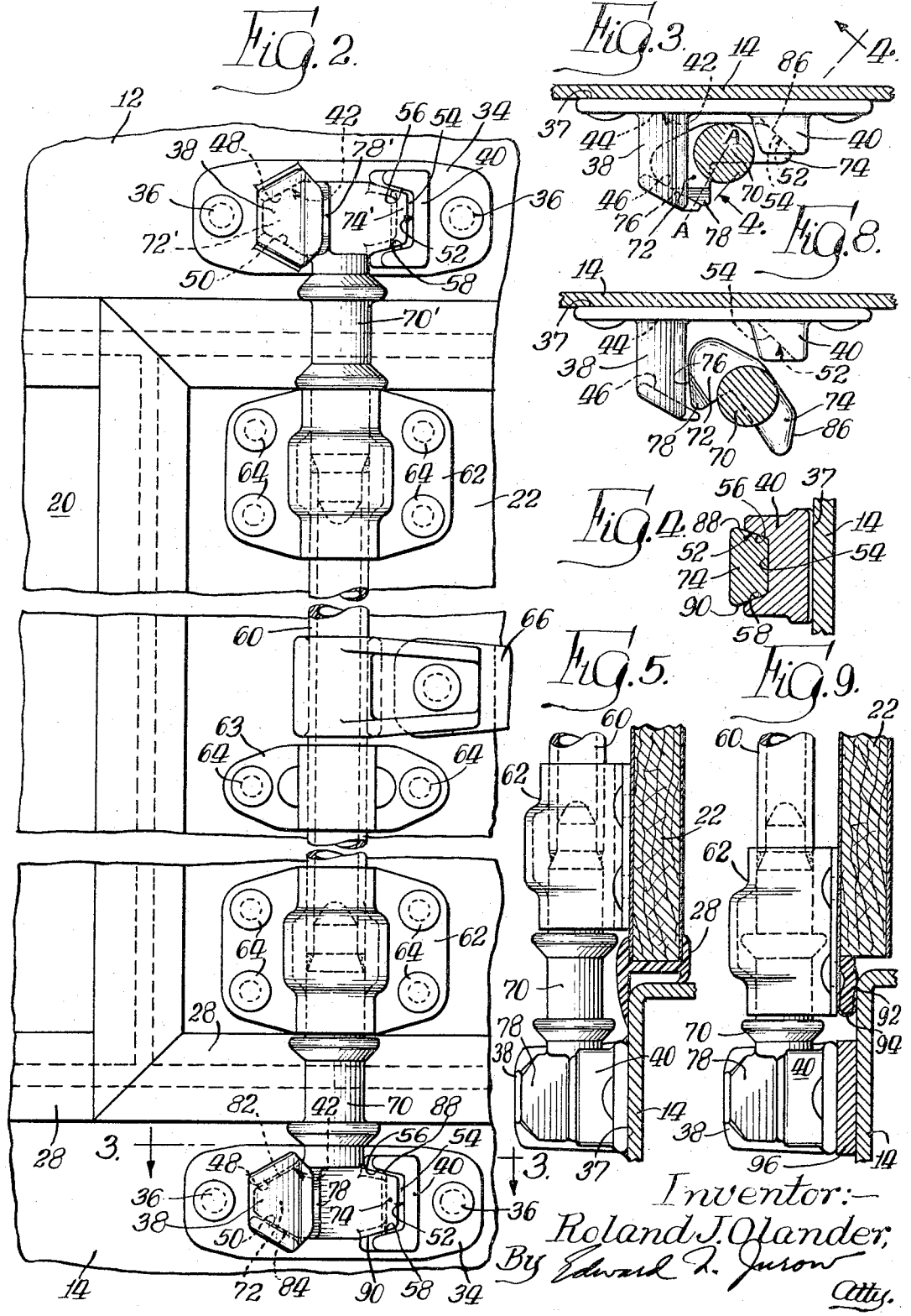

3,329,456
DOOR FASTENING MEANS
Roland J. Olander, La Grange, Ill., assignor to W. H. Miner, Inc., Chicago, Ill., a corporation of Delaware
Filed Oct. 19, 1964, Ser. No. 404,874
4 Claims. (Cl. 292—218)

My present invention relates to door fastening means for locking in closed position the doors of transport vehicles and the like.

Transport vehicles or highway trailers having enclosed trailer bodies are usually provided at the rear end thereof either with a single door which has a vertical edge hinged to the one side of the rear frame of the trailer body or a pair of doors each of which has a vertical edge hinged to the opposite sides of the rear frame of the trailer body. These doors are adapted to be swung within the plane of the rear frame of the trailer body for closing the rear end thereof.

It is an object of my present invention to provide door fastening means which may be actuated to locked position to retain the door or doors within the door frame and which will not accidentally become unlocked when outward forces are imposed on the doors, for example, as a result of shifting loads within the trailer body.

It is another object of my present invention to provide door fastening means, as described, which is operative to force the door or doors within the plane of the frame as they approach the latter.

It is a further object of my present invention to provide door fastening means, as described, which is operative to force the frame and door relatively in a vertical direction to align the same as the doors are swung within the plane of the frame.

Now in order to acquaint those skilled in the art with the manner of constructing and utilizing door fastening means in accordance with the principles of my present invention, I shall describe in connection with the accompanying drawings a preferred embodiment of my invention.

In the drawings:

FIGURE 1 is an elevational view of a door frame and a pair of doors with which the door fastening means of my present invention has been incorporated;

FIGURE 2 is a fragmentary view, on an enlarged scale, of the door frame, doors and door fastening means of FIGURE 1;

FIGURE 3 is a horizontal sectional view, taken substantially along the line 3—3 in FIGURE 2, looking in the direction indicated by the arrows;

FIGURE 4 is a vertical sectional view, taken substantially along the line 4—4 in FIGURE 3, looking in the direction indicated by the arrows;

FIGURE 5 is a right side elevational view of the lower portion of the door fastening means shown in FIGURE 2;

FIGURE 6 is an enlarged front elevational view of the lower end portion of the shaft extension element of the door fastening means of my present invention;

FIGURE 7 is a left side elevational view of the shaft extension element shown in FIGURE 6;

FIGURE 8 is a horizontal sectional view corresponding generally to FIGURE 3, but showing the elements of the door fastening means in a disengaged position; and FIGURE 9 is a side elevational view of the lower portion of the door fastening means of my present invention and shows an alternative mounting arrangement therefor.

Referring now to FIGURE 1, there is indicated generally by the reference numeral 10 a conventional door frame which may, for example, be located at the rear end of the body of an enclosed transport vehicle. The door frame 10 comprises horizontal upper and lower structural elements 12 and 14 and vertical side structural elements 16 and 18. Disposed within the door frame 10 for closing the same are a pair of doors 20 and 22 which are, respectively, pivotally mounted along their one vertical edges to the side door frame elements 16 and 18 by means of hinges 24 and 26. As shown in FIGURES 2 and 5, the outer peripheral edges of the doors 20 and 22 are spaced from the inner periphery of the door frame 10 and from each other. To provide a suitable seal enclosure, resilient strip material 28 of generally H-shaped cross-sectional configuration may be secured about the edges of the doors 20 and 22, with the strip material along the vertical free edge of the door 22 being arranged to overlap the vertical free edge of the door 20. If desirable or necessary there may be secured to the rear face of the door 20 along the vertical free edge thereof a stop or limit strip arranged to be engaged by the vertical free edge of the door 22 for preventing outward swinging movement of the door 20 when the doors 20 and 22 are within the plane of the door frame 10.

The door fastening means of my present invention, which is adapted to secure the doors 20 and 22 within the door frame 10, comprises a pair of keeper members 34 mounted, as by bolts 36, to the upper and lower door frame elements 12 and 14. Each keeper member 34, as shown in FIGURES 2, 3 and 4, has a planar mounting surface 37 and laterally spaced forwardly extending projections 38 and 40. The projection 38 has a lateral opening 42 therein with an inner rearward surface 44 parallel to the planar mounting surface 37. The lateral opening 42 also has an inner forward surface 46 which faces the center of the keeper member 34 at an oblique angle to the inner rearward surface 44. Still further, the upper and lower inner surfaces 48 and 50 of the lateral opening 42 taper toward each other in a lateral direction away from the center of the keeper member 34. The projection 40 has a recess 52 therein with an open side and forward end, and with an inner side surface 54 facing the center of the keeper member 34 at an oblique angle to the planar mounting surface 37. The recess 52 is also formed with upper and lower inner surfaces 56 and 58 which taper toward each other both in a rearward direction and in a lateral direction away from the center of the keeper member 34.

Arranged for operative association with the keeper members 20, as shown in FIGURES 1 and 2 is a vertically extending hollow shaft 60 rotatably journalled in bracket members 62 and 63 suitably secured, as by bolts 64, to the outer face of the door 22. Means for rotating the shaft 60 is provided in the form of a horizontal hand lever 66 normally retained, as shown in FIGURE 1, in a conventional seal assembly indicated generally by the reference numeral 68.

Secured within the lower and upper ends, respectively, of the hollow shaft 60 are shaft extensions in the form of latch or carrier members 70 and 70' which, as shown in FIGURES 2 and 5, are rotatably guided in the bracket members 62. As shown in FIGURES 2, 3, 6 and 7, the shaft extension 70 is formed with first and second arm portions 72 and 74 adapted to be received, respectively, in the lateral opening 42 and in the recess 52 of the lower keeper member 34. The arm portion 72 has a planar outer end surface 76 which normally faces angularly forwardly at an oblique angle to the lengthwise axis of the arm portion 74. The outer end surface 76 extends to either side of and is perpendicular to a plane (indicated by the broken line A—A in FIGURE 3) passing through the axis of rotation of the carrier member 70 and shaft 60. Projecting beyond the plane A—A is a nose portion 78 having upper and lower outer beveled end portions. The arm portion 72 further has upper and lower surfaces 82 and 84 tapered toward each other in a direction away from the center of the carrier member 70 for interengagement with the upper and lower inner surfaces 48 and 50 of the lateral opening 42 in the keeper member 34. The arm portion 74 of the shaft extension 70 is formed with a planar outer end surface 86 which faces angularly rearwardly at an oblique angle to the lengthwise axis thereof. In addition, the upper and lower surfaces 88 and 90 of the arm portion 74 taper toward each other both in a rearward direction and in a lateral direction away from the center of the carrier member 70. The upper and lower surfaces 88 and 90 of the arm portion 74 are suitably arranged for interengagement with the upper and lower surfaces 56 and 58 of the recess 52 in the keeper member 34, while the outer end surface 86 is arranged for interengagement with the inner side surface 54 of the recess 52 in the keeper member 34. The upper shaft extension or carrier member 70' is formed with arm portions 72' and 74' which are identical in configuration to the aforedescribed arm portions 72 and 74 respectively; a plan view of the arm portions 72' and 74' would correspond to the plan view of the arm portions 72 and 74 in FIGURES 3 and 8.

The elements of the door fastener of my present invention are shown in a locked or closed position in FIGURES 1 through 5. To unlock the door fastening means, the hand lever 66 may be released from the seal assembly 68 and swung in a horizontal plane toward a forwardly extending position so that the shaft 60 and shaft extensions 70–70' are caused to rotate clockwise, as viewed in FIGURE 3, on their common axes. As the shaft extensions 70–70' are thus rotated, the door 22 is first urged slightly inwardly of the door frame 10 against the resilient seal strip 28 until the nose portions 78–78' of the carrier arms 72–72' are rotated clear of the inner forward surfaces 46 of the keeper members 34. Simultaneously, the arm portions 74 and 74' are moved outwardly of the recesses 52 in the keeper members 34 and then the arm portions 72 and 72' are withdrawn from the openings 42 as the axis of rotation of the shaft 60 and carrier members 70–70' moves arcuately away from the keeper members 34 to the position shown in FIGURE 8. Thereafter, the doors 20 and 22 may be swung outwardly of the plane of the door frame 10 to a fully open position.

In closing the door frame 10, the doors 20 and 22 are swung toward the plane of the frame 10 with the carrier members positioned generally as shown in FIGURE 8. Then, the hand lever 66 is pivoted toward the position shown in FIGURE 1 whereupon the shaft 60 is rotated for causing the arm portions 72–72' to enter the lateral openings 42 in the keeper members 34. As the nose portions 78–78' of the carrier arms 72–72' begin to engage the inner forward surfaces 46 of the lateral openings 42 in the keeper members 34, the points of contact serve as fulcrum points about which leverage is applied to force the door 22 within the plane of the frame 10. Further rotation of the shaft 60 disposes the arm portions 72–72' more fully within the openings 42. As the upper and lower surfaces of the arm portions 72–72' engage the upper and lower inner surfaces 48 and 50 of the lateral openings 42, and as the upper and lower surfaces of the arm portions 74–74' engage the upper and lower inner surfaces 56 and 58 of the recesses 52, the frame 10 and door 22 are forced relatively in a vertical direction and are aligned as the door 22 is swung within the plane of the frame. In approaching the fully closed position, the door 22 is urged slightly inwardly of the position shown in FIGURE 5, which movement is accommodated by flexure of the resilient seal strips 28, to permit the carrier nose portions 78–78' to be rotated "over-center" to the position shown in FIGURE 3. When the nose portions 78–78' have been rotated "over-center," the resilient strips 28 serve thereafter to urge and normally maintain the outer end surfaces of the arm portions 72–72' in full engagement with the inner forward surfaces 46 of the lateral openings 42 thereby restraining the door 22 from swinging outwardly of the plane of the door frame. The outer end surfaces of the arm portions 72–72' which extend beyond the perpendicular plane A—A at the nose portions 78–78' prevent clockwise rotation of the carrier members 70–70', as viewed in FIGURE 3, until the door 22 is first urged sufficiently inwardly against the resilient seal strips 28 to permit the nose portions 78–78' to be rotated past the "over-center" position shown in FIGURE 3. Thus, the door fastening means of my present invention will not accidentally become unlocked when outward forces are imposed on the doors, for example, as a result of shifting loads within the trailer body. When the arm portions 72–72' and 74–74' have been disposed in full engagement with the keeper members 34, the outer end surfaces of the arm portions 74–74' engage the inner side surfaces 54 of the recesses 52 in the keeper members 34 thereby serving to limit relative lateral shifting movement between the carrier members 70–70' and the keeper members 34.

In an alternative mounting arrangement for the door fastening means of my present invention, as shown in FIGURE 9, the generally H-shaped resilient strip material 28 is replaced with resilient strip material 92 held in compression in wave form by a hanger channel 94. When the door 22 is generally within the plane of the door frame 10, the strip material 92 is engageable with the outer face of the adjacent door frame. In this arrangement, the upper and lower bracket members 62 are mounted to the door 22 so as to project beyond the upper and lower edges thereof. The shaft extensions 70–70' are rotatably journalled in the bracket members 62, and the keeper members are each spaced from the door frame a distance approximately the thickness of the strip material 92 and hanger channel 94. To accomplish the necessary spacing, either a shim 96 may be used or the casting of the keeper member may be extended rearwardly.

While I have shown and described what I believe to be a preferred embodiment of my present invention it will be understood by those skilled in the art that various rearrangements and modifications may be made therein without departing from the spirit and scope of my invention.

I claim:

1. Door fastening means comprising a keeper member having a planar mounting surface and laterally spaced forwardly extending projections, one of said projections of said keeper member having a lateral opening therein with an inner rearward surface parallel to said planar mounting surface and with an inner forward surface facing the center of said keeper member at an oblique angle to said inner rearward surface and with upper and lower inner surfaces tapering toward each other in a lateral direction away from the center of said keeper member, the other of said projections of said keeper member having a recess therein with an open side and forward end with an inner side surface facing the center of said keeper member at an oblique angle to said planar mounting surface and with upper and lower inner surfaces tapering toward each other both in a rearward direction and in a lateral direction away from the center of said keeper member, a latch member rotatable relative to said keeper member, first and second arm portions on said latch member at the opposite sides thereof and adapted to be received respectively in said lateral opening and in said recess of said keeper member on rotation of said latch member, said first arm portion having a planar outer end surface facing angularly forwardly at an oblique angle to the lengthwise axis of said second arm portion, said outer end surface of said first arm portion extending to either side of and being perpendicular to a plane passing along the axis of rotation of said latch member, said first arm portion having upper and lower surfaces which taper toward each other in a lateral direction away from the center of said latch member, said second arm portion having a planar outer end surface facing angularly rearwardly at an oblique angle to the lengthwise axis thereof and having upper and lower surfaces which taper toward each other both in a rearward direction and in a lateral direction away from the center of said latch member, said first arm portion during initial engagement with said inner forward surface of said lateral opening in said keeper member serving to force said latch member toward said keeper member, said first arm portion upon engagement with said upper and lower inner surfaces of said lateral opening in said keeper member and said second arm portion upon engagement with said upper and lower inner surfaces of said recess serving to align said latch member and said keeper member and to hold the same against relative vertical movement, said outer end surface of said first arm portion when in full engagement with said inner forward surface of said lateral opening in said keeper member serving to restrain the latch member from rotation relative to said keeper member, and said outer end surface of said second arm portion upon engagement with said inner side surface of said recess in said keeper member serving to limit relative lateral shifting movement between said latch member and said keeper member.

2. For use with a door frame having upper and lower elements and a door having a vertical edge hinged to the frame, the combination of a vertically extending shaft rotatably mounted on the outer face of the door, a keeper member mounted on the upper and lower elements of the frame, each of said keeper members having a planar mounting surface and laterally spaced forwardly extending projections, one of said projections of each of said keeper members having a lateral opening therein with an inner rearward surface parallel to said planar mounting surface and with an inner forward surface facing the center of said keeper member at an oblique angle to said inner rearward surface and with upper and lower inner surfaces tapering toward each other in a lateral direction away from the center of said keeper member, the other of said projections of each of said keeper members having a recess therein with an open side and forward end and with an inner side surface facing the center of said keeper member at an oblique angle to said planar mounting surface and with upper and lower inner surfaces tapering toward each other both in a rearward direction and in a lateral direction away from the center of said keeper member, first and second arm portions on the upper and lower ends of said shaft at the opposite sides thereof and adapted to be received respectively in said lateral openings and in said recesses of said keeper members on rotation of said shaft, said first arm portions having a planar outer end surface facing angularly forwardly at an oblique angle to the lengthwise axis of said second arm portions, said outer end surfaces of said first arm portions extending to either side of and being perpendicular to a plane passing along the axis of rotation of said shaft, said first arm portions having upper and lower surfaces which taper toward each other in a lateral direction away from the center of said shaft, said second arm portions having a planar outer end surface facing angularly rearwardly at an oblique angle to the lengthwise axis thereof and having upper and lower surfaces which taper toward each other both in a rearward direction and in a lateral direction away from the center of said shaft, said first arm portions during initial engagement with said inner forward surfaces of said lateral openings in said keeper members serving to force said shaft toward said keeper members, said first arm portions upon engagement with said upper and lower inner surfaces of said lateral openings in said keeper members and said second arm portions upon engagement with said upper and lower inner surfaces of said recesses serving to align said shaft and said keeper members and to hold the same against relative vertical movement, said outer end surfaces of said first arm portions when in full engagement with said inner forward surfaces of said lateral openings in said keeper members serving to restrain said shaft from rotation relative to said keeper members, and said outer end surfaces of said second arm portions upon engagement with said inner side surfaces of said recesses in said keeper members serving to limit relative lateral shifting movement between said shaft and said keeper members.

3. For use in a door fastener, a keeper member having a planar mounting surface and laterally spaced forwardly extending projections, one of said projections of said keeper member having a lateral opening therein with an inner rearward surface parallel to said planar mounting surface and with an inner forward surface facing the center of the keeper member at an oblique angle to said inner rearward surface and with upper and lower inner surfaces tapering toward each other in a lateral direction away from the center of the keeper member, and the other of said projections of said keeper member having a recess therein with an open side and forward end and with an inner side surface facing the center of the keeper member at an oblique angle to said planar mounting surface and with upper and lower inner surfaces tapering toward each other both in a rearward direction and in a lateral direction away from the center of the keeper member.

4. For use in a door fastener, a rotatable latch member having first and second arm portions at the opposite sides thereof, said first arm portion having a planar outer end surface facing angularly forwardly at an oblique angle to the lengthwise axis of said second arm portion, said outer end surface of said first arm portion extending to either side of and being perpendicular to a plane passing along the axis of rotation of said latch member, and said second arm portion having a planar outer end surface facing angularly rearwardly at an oblique angle to the lengthwise axis thereof and having upper and lower surfaces which taper toward each other both in a rearward direction and in a lateral direction away from the center of the latch member.

References Cited

UNITED STATES PATENTS

| | | | |
|---|---|---|---|
| 1,429,891 | 9/1922 | Laufer et al. | |
| 1,503,393 | 7/1924 | Twardowsky. | |
| 2,249,644 | 7/1941 | Anderson | 292—223 X |
| 2,301,444 | 11/1942 | Olander | 292—241 X |
| 2,451,537 | 10/1948 | Dath | 292—241 X |
| 2,679,420 | 5/1954 | Crockett et al. | |
| 2,861,830 | 11/1958 | Bennett | 292—218 X |
| 3,099,473 | 7/1963 | Pastva | 292—218 X |
| 3,160,433 | 12/1964 | Chieger et al. | 292—218 X |

FOREIGN PATENTS

| | | |
|---|---|---|
| 406,811 | 3/1934 | Great Britain. |

MARVIN A. CHAMPION, *Primary Examiner.*

RICHARD E. MOORE, *Examiner.*